US012783002B2

(12) United States Patent
Chalmers

(10) Patent No.: US 12,783,002 B2
(45) Date of Patent: Nov. 3, 2026

(54) ASSOCIATING CHRONOLOGY WITH PHYSICAL ARTICLE

(71) Applicant: Apple Inc., Cupertino, CA (US)

(72) Inventor: Devin W. Chalmers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 18/291,976

(22) PCT Filed: Jul. 26, 2022

(86) PCT No.: PCT/US2022/038299
§ 371 (c)(1),
(2) Date: Jan. 25, 2024

(87) PCT Pub. No.: WO2023/009491
PCT Pub. Date: Feb. 2, 2023

(65) Prior Publication Data

US 2024/0353891 A1 Oct. 24, 2024

Related U.S. Application Data

(60) Provisional application No. 63/226,371, filed on Jul. 28, 2021.

(51) Int. Cl.
*G06F 1/14* (2006.01)
*G06F 3/01* (2006.01)
(Continued)

(52) U.S. Cl.
CPC ................ *G06F 1/14* (2013.01); *G06F 3/011* (2013.01); *G06F 3/04815* (2013.01); *G06T 19/006* (2013.01); *G06T 2210/21* (2013.01)

(58) Field of Classification Search
CPC ........ G06F 1/14; G06F 3/011; G06F 3/04815; G06F 3/017; G06F 3/0481;
(Continued)

(56) References Cited

U.S. PATENT DOCUMENTS 6,061,062 A * 5/2000 Venolia ................. G06F 3/0481 715/856
6,486,896 B1 * 11/2002 Ubillos ............... G06F 3/04855 715/830
(Continued)

FOREIGN PATENT DOCUMENTS

CN 107850936 A 3/2018
CN 112017299 A 12/2020
WO WO-2020165042 A1 * 8/2020 ............. G16H 50/30

OTHER PUBLICATIONS

Kaori Fujinami et al., "A middleware for a tabletop procedure-aware information display." Multimedia Tools and Applications 57 (2012): 269-293. (Abstract Only).
(Continued)

*Primary Examiner* — Jeffery A Brier
(74) *Attorney, Agent, or Firm* — Fernando & Partners, LLP

(57) ABSTRACT

Various implementations disclosed herein include devices, systems, and methods for associating chronology with a physical article. In some implementations, a device includes a display, one or more processors, and a memory. The method may include presenting an environment comprising a representation of a physical article. An amount of time since a previous event associated with the physical article may be monitored. An indicator of the amount of time may be displayed proximate the representation of the physical article.

20 Claims, 15 Drawing Sheets

(51) Int. Cl.
*G06F 3/04815* (2022.01)
*G06T 19/00* (2011.01)

(58) Field of Classification Search
CPC .. G06F 3/04817; G06F 3/04847; G06F 3/013; G06T 19/006; G06T 2210/21
See application file for complete search history.

(56) References Cited

U.S. PATENT DOCUMENTS

| | | | | |
|---|---|---|---|---|
| 2016/0179353 | A1* | 6/2016 | Iskander | G06F 1/163 715/765 |
| 2017/0285737 | A1* | 10/2017 | Khalid | G06F 3/013 |
| 2017/0322632 | A1* | 11/2017 | Kovach | G09G 5/377 |
| 2019/0370715 | A1 | 12/2019 | Fikani | |
| 2020/0410760 | A1 | 12/2020 | De Jong et al. | |
| 2021/0157143 | A1 | 5/2021 | Grundhoefer et al. | |
| 2021/0232212 | A1* | 7/2021 | Stolzenberg | G02B 27/0093 |
| 2022/0236577 | A1* | 7/2022 | Bagneris | G06F 3/011 |

OTHER PUBLICATIONS

PCT International Search Report and Written Opinion dated Nov. 3, 2022, PCT International Application No. PCT/US2022/038299, pp. 1-12.

Office Action for corresponding Chinese Appl. No. 202280052409.0 dated Aug. 28, 2026 (not translated).

* cited by examiner

300

300

ASSOCIATING CHRONOLOGY WITH PHYSICAL ARTICLE

CROSS-REFERENCE TO RELATED APPLICATION

This application claims the benefit of U.S. Provisional Patent App. No. 63/226,371, filed on Jul. 28, 2021, which is incorporated by reference in its entirety.

TECHNICAL FIELD

The present disclosure generally relates to interacting with computer-generated content.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
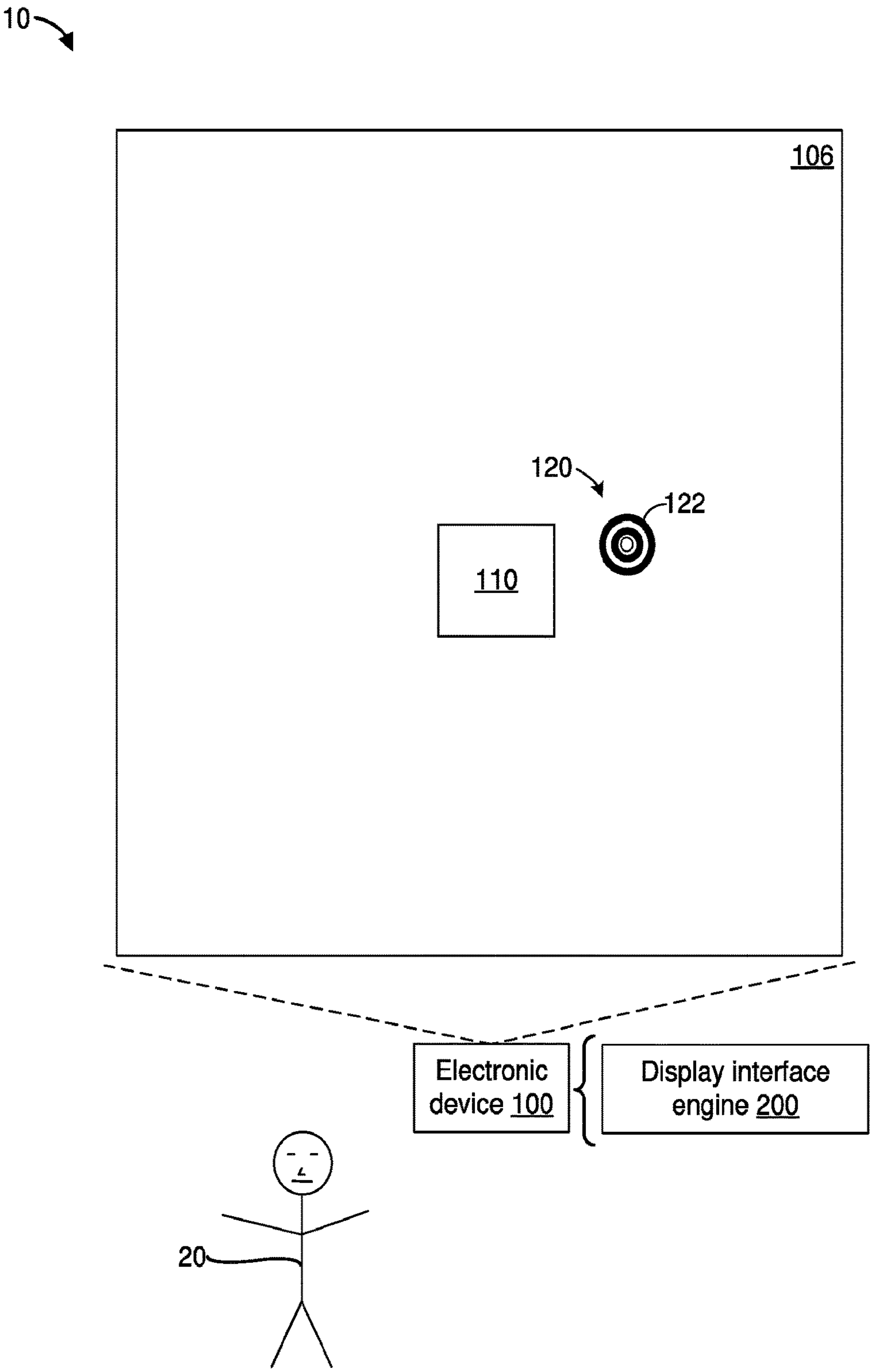
FIGS. 1A-1K are diagrams of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for associating chronology with a physical article. In some implementations, a device includes a display, one or more processors, and a memory. The method may include presenting an environment comprising a representation of a physical article. An amount of time since a previous event associated with the physical article may be monitored. An indicator of the amount of time may be displayed proximate the representation of the physical article.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Some devices display an extended reality (XR) environment that includes one or more objects, e.g., representations of physical articles. Representations of physical articles may include sets of pixels representing physical articles, e.g., in the case of a video passthrough. In some implementations, representations of physical articles include the physical articles themselves, e.g., as seen through a lens, as in the case of an optical passthrough.

A user may wish to track a duration of time that is associated with a physical article. For example, the user may wish to monitor a duration of time that has elapsed since a most recent interaction with the physical article. A timer application may be used to track a duration of time that is associated with a physical article. In some implementations, a timer application may be used to track multiple durations of time. However, tracking multiple durations of time may cause the user to lose track of one or more timers. When timers are run for long periods of time, e.g., days or weeks, a user may forget that a timer is running, diminishing the utility of the timer.

The present disclosure provides methods, systems, and/or devices for associating chronology with a physical article. In some implementations, a physical article is associated with a user interface element that displays an indicator of the elapsed time between interactions with the physical article or an indicator of the elapsed time since the most recent interaction with the physical article. The user interface element may be displayed when a user looks at the physical article. In some implementations, the appearance of the user interface element changes with the time scale of the elapsed time. For example, the user interface element may have one appearance when indicating time in hours and another appearance when indicating time in days.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a display interface engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

In the example of FIG. 1A, the display interface engine 200 resides at the electronic device 100. For example, the electronic device 100 implements the display interface engine 200. In some implementations, the electronic device 100 includes a set of computer-readable instructions corresponding to the display interface engine 200. Although the display interface engine 200 is shown as being integrated into the electronic device 100, in some implementations, the display interface engine 200 is separate from the electronic device 100. For example, in some implementations, the display interface engine 200) resides at another device (e.g., at a controller, a server or a cloud computing platform).

As illustrated in FIG. 1A, in some implementations, the electronic device 100 presents an extended reality (XR) environment 106 that includes a representation of a physical article. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes a representation 110 of a physical article. The representation 110 may include a set of pixels representing a physical article, e.g., in the case of a video passthrough. In some implementations, the representation 110 includes the physical article, e.g., as seen through a lens, as in the case of an optical passthrough.

In some implementations, the physical article is associated with a duration of time. The duration of time may be an amount of time since a previous event associated with the physical article. In some implementations, the previous event is a user interaction with the physical article. For example, if the physical article is a plant, the physical article may be associated with an elapsed time since the last time the plant was watered. As another example, if the physical article is an oven, the physical article may be associated with a cooking time, e.g., an elapsed time since the oven was turned on.

In some implementations, the electronic device 100 monitors the amount of time since the previous event associated with the physical article. For example, the electronic device 100 may include a timer that monitors the amount of time since the previous event. In some implementations, the electronic device 100 compares a first timestamp (e.g., corresponding to a current time) with a second timestamp (e.g., corresponding to a time associated with the previous event) to determine the amount of time since the previous event. In some implementations, the electronic device 100 receives an indication of the amount of time since the previous event.

In some implementations, the electronic device 100 displays an indicator 120 of the amount of time proximate the representation 110 of the physical article. The indicator 120 may have an appearance that represents the amount of time. For example, as represented in FIG. 1A, the indicator 120 may include one or more rings 122. The appearance of the rings 122 may represent the amount of time. For example, a ring 122 may be displayed with a thickness that corresponds to the amount of time: e.g., a thicker ring may represent a greater amount of time than a thinner ring. In some implementations, a ring 122 may include an arc section that has a size that corresponds to the amount of time. As the amount of time increases, the size of the arc section may also increase.

Figure 1B:
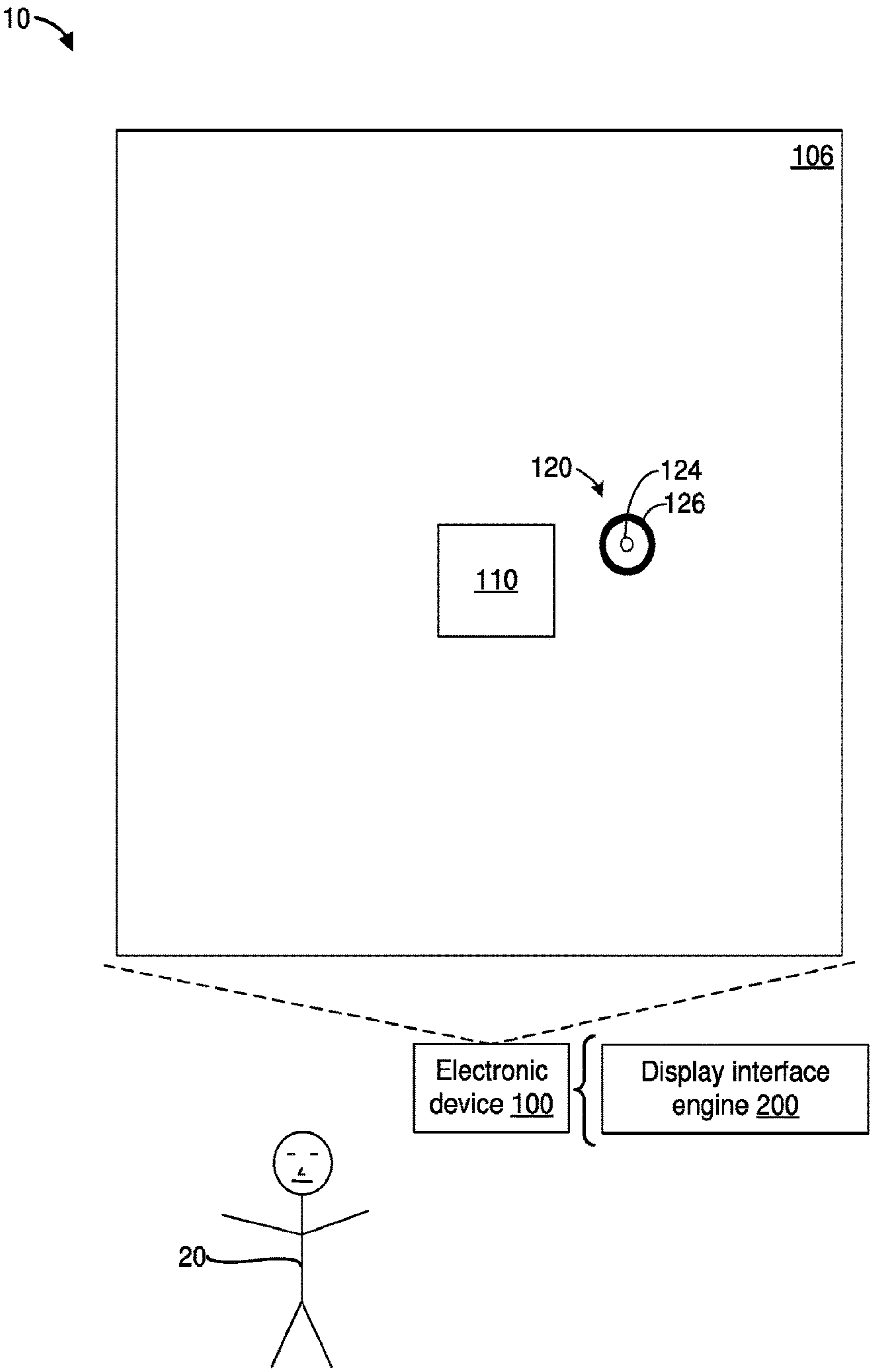

As represented in FIG. 1B, in some implementations, the electronic device 100 changes a visual property of the indicator 120 based on a time scale of the indicator 120. For example, the electronic device 100 may change a dimension (e.g., a thickness) of the indicator to indicate that the indicator represents a larger or smaller unit of time. As represented in FIG. 1B, a first ring 124 having a first thickness may represent minutes. A second ring 126 having a second thickness greater than the first thickness may represent hours. In some implementations, multiple first rings 124 and/or multiple second rings 126 are used to represent multiple minutes and/or hours, respectively. In some implementations, a single first ring 124 represents minutes and a single second ring 126 represents hours, and the first ring 124 and the second ring 126 include respective arc sections that correspond to the number of minutes and hours, respectively.

Figure 1C:
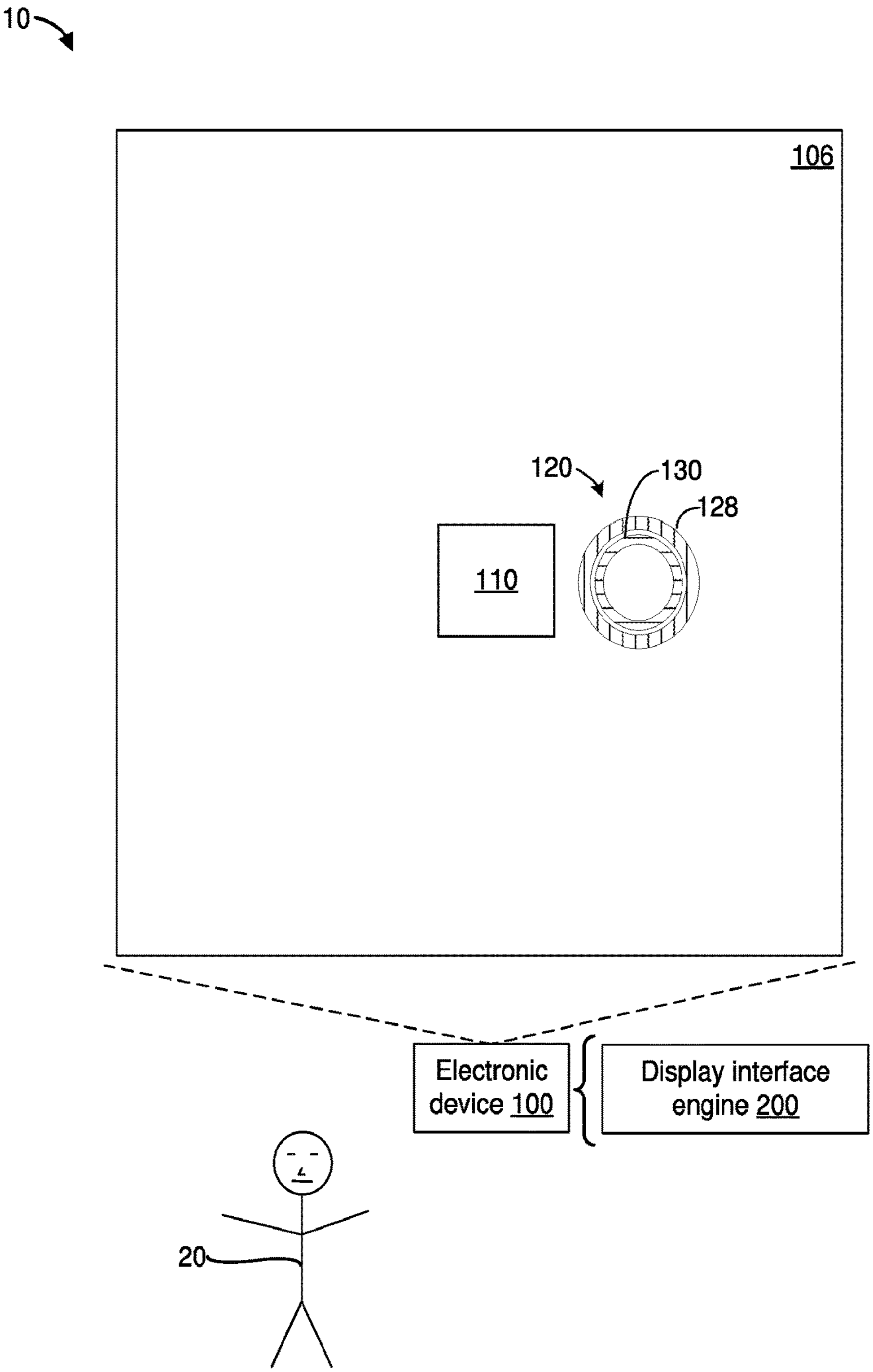

As represented in FIG. 1C, in some implementations, the electronic device 100 changes a color of the indicator 120 based on a time scale of the indicator 120. For example, a first ring 128 having a first color may represent hours. A second ring 130 having a second color different from the first color may represent days. In some implementations, multiple first rings 128 and/or multiple second rings 130 are used to represent multiple hours and/or days, respectively. In some implementations, a single first ring 128 represents hours and a single second ring 130 represents days, and the first ring 128 and the second ring 130 include respective arc sections that correspond to the number of hours and days, respectively.

Figure 1D:
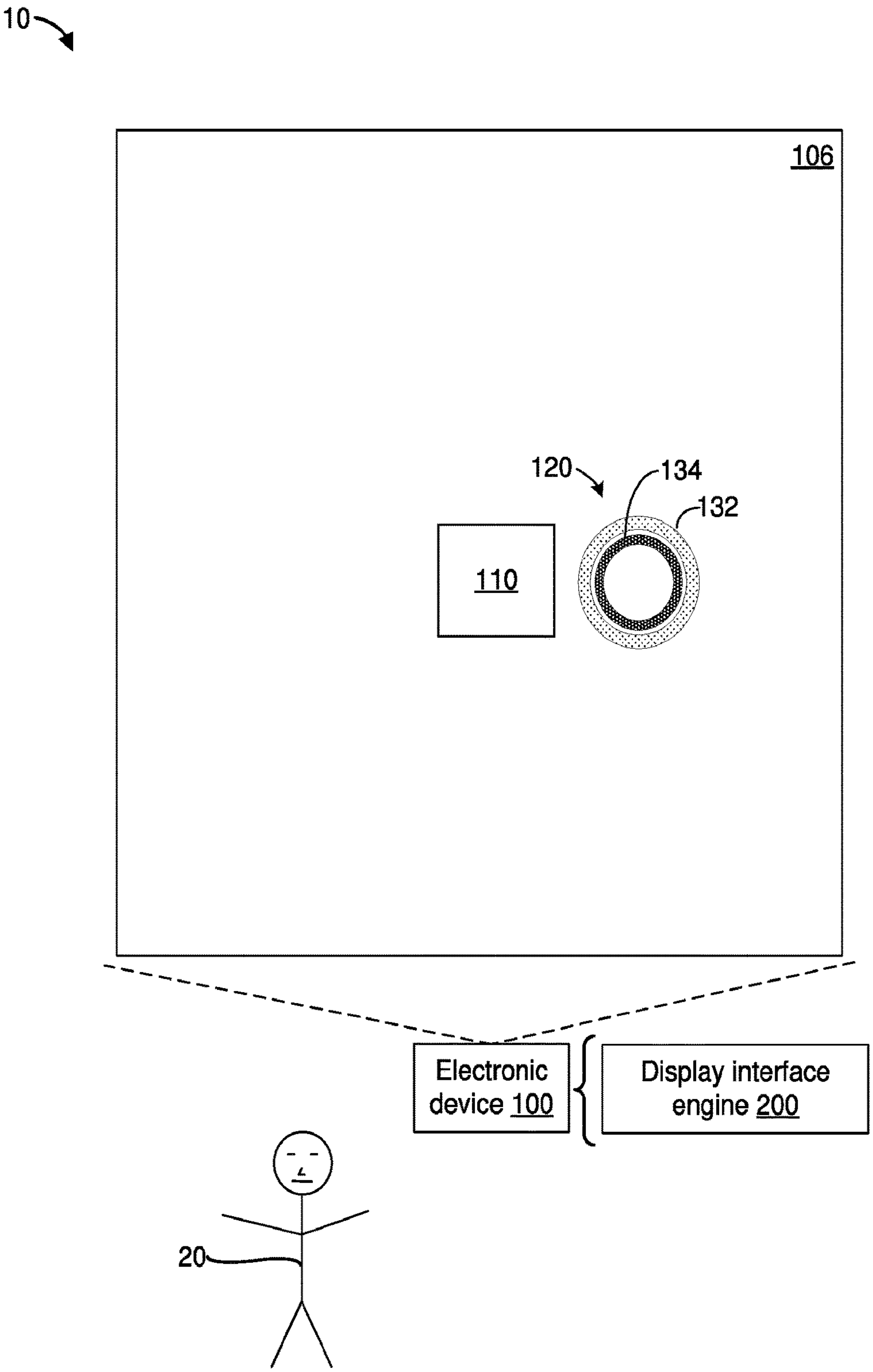

As represented in FIG. 1D, in some implementations, the electronic device 100 changes a brightness of the indicator 120 based on a time scale of the indicator 120. For example, a first ring 132 having a first brightness level may represent days. A second ring 134 having a second brightness level different from the first brightness level may represent weeks. In some implementations, multiple first rings 132 and/or multiple second rings 134 are used to represent multiple day's and/or weeks, respectively. In some implementations, a single first ring 132 represents days and a single second ring 134 represents weeks, and the first ring 132 and the second ring 134 include respective arc sections that correspond to the number of days and weeks, respectively.

Figure 1E:
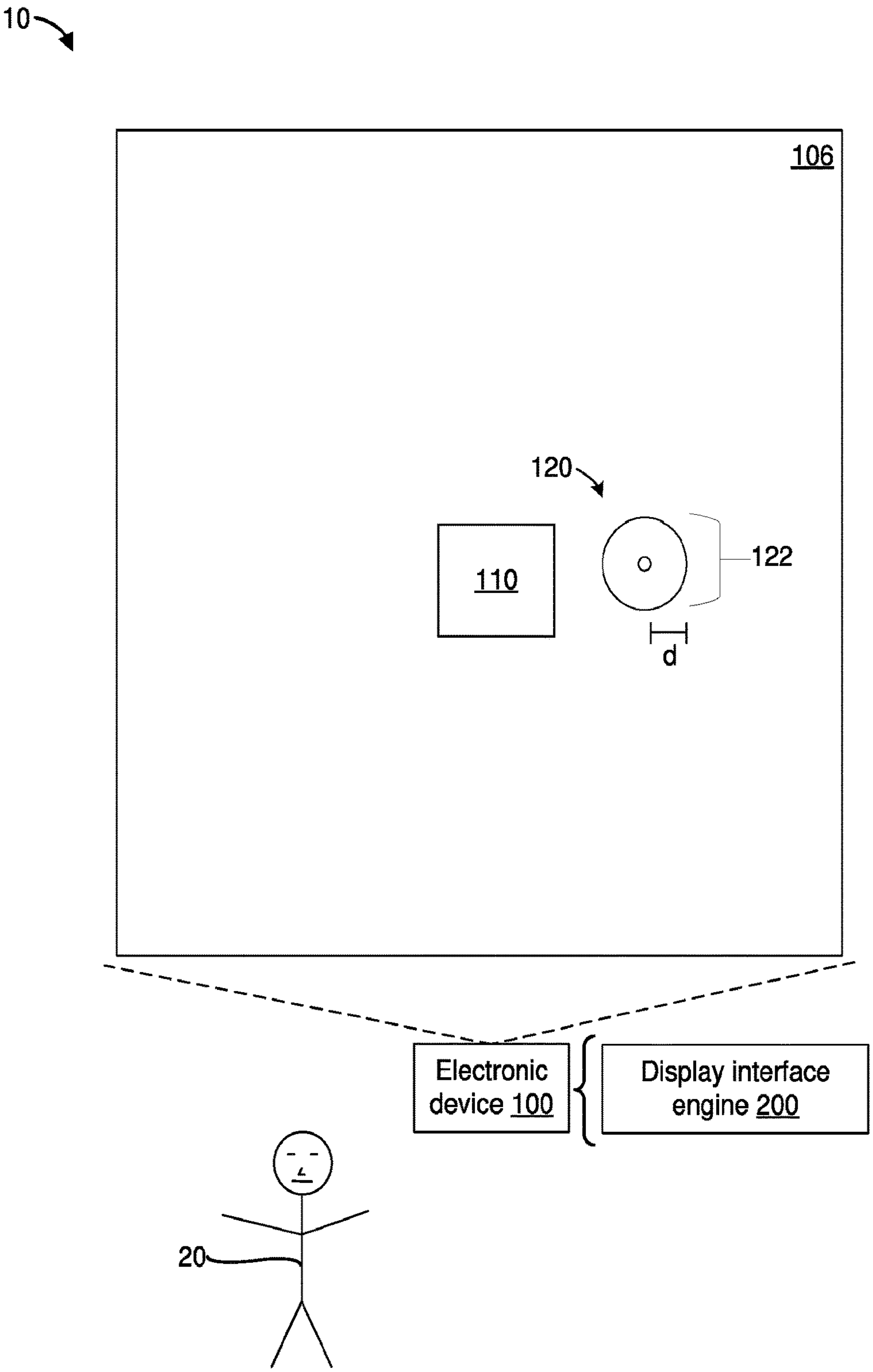

As represented in FIG. 1E, in some implementations, the indicator 120 includes a plurality of rings 122. The rings 122 are separated by a distance d. In some implementations, the distance d changes based on the amount of time. For example, the distance d may decrease as the amount of time increases (e.g., the rings 122 may become closer together). In some implementations, when the amount of time breaches a threshold (e.g., an hour), the time scale of the indicator 120 changes, and a visual property of the indicator 120 may change as disclosed herein.

Figure 1F:
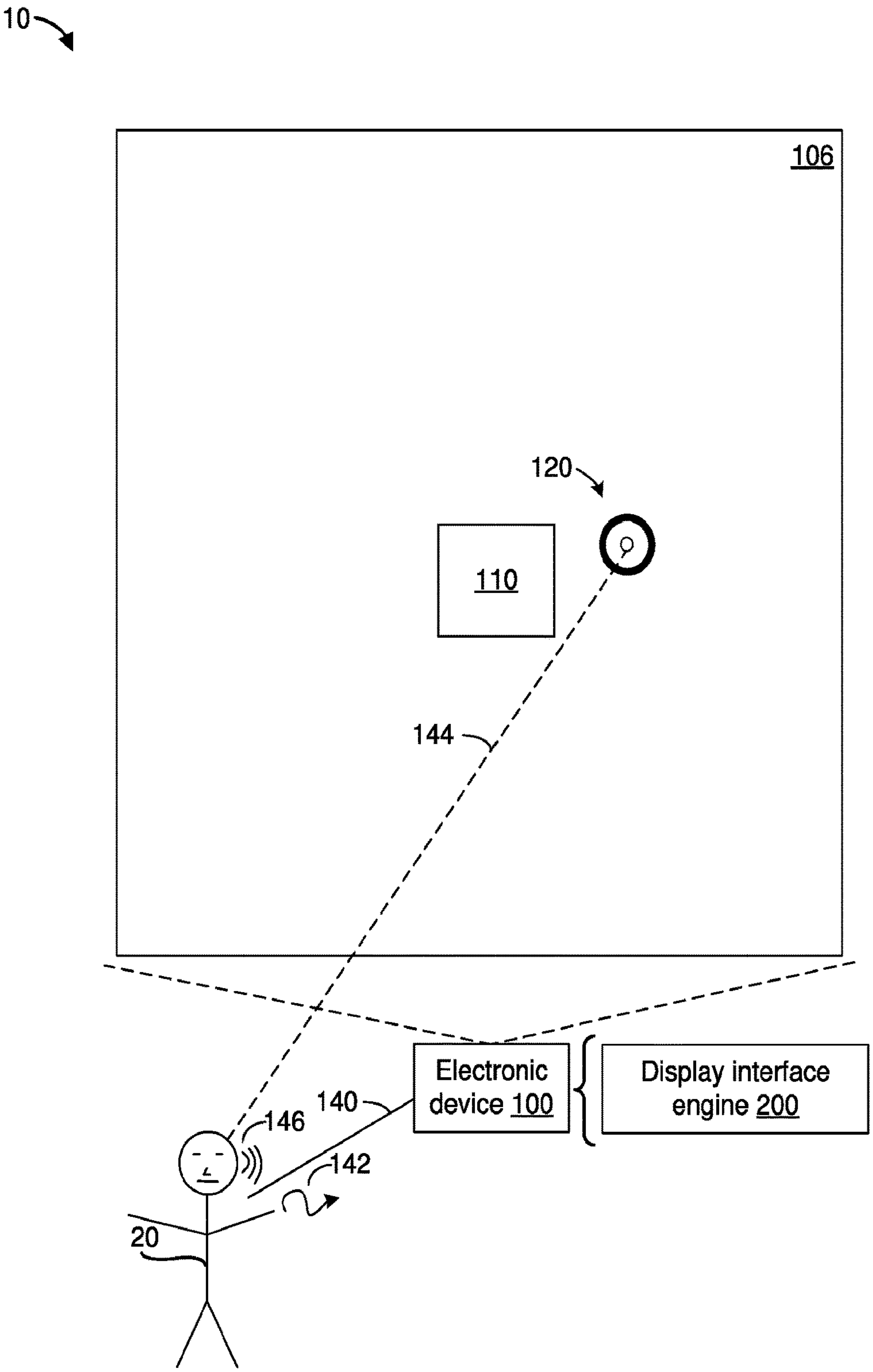

As represented in FIG. 1F, in some implementations, the electronic device 100 detects a user input 140 directed to the indicator 120. For example, the user input 140 may include a gesture input 142 obtained by an image sensor (e.g., a scene-facing image sensor). In some implementations, the user input 140 includes a gaze input 144. For example, a user-facing image sensor (e.g., a front-facing camera or an inward-facing camera) may capture a set of one or more images of the eyes of the user 20 and may generate image data. The image data may be used to determine a gaze vector. The electronic device 100 may determine, based on the gaze vector, that the gaze of the user 20 is directed to a location (e.g., the indicator 120) within the field of view. In some implementations, the user input 140 includes an audio input 146. For example, an audio sensor may obtain an audio signal corresponding to a spoken command (e.g., "reset the timer").

Figure 1G:
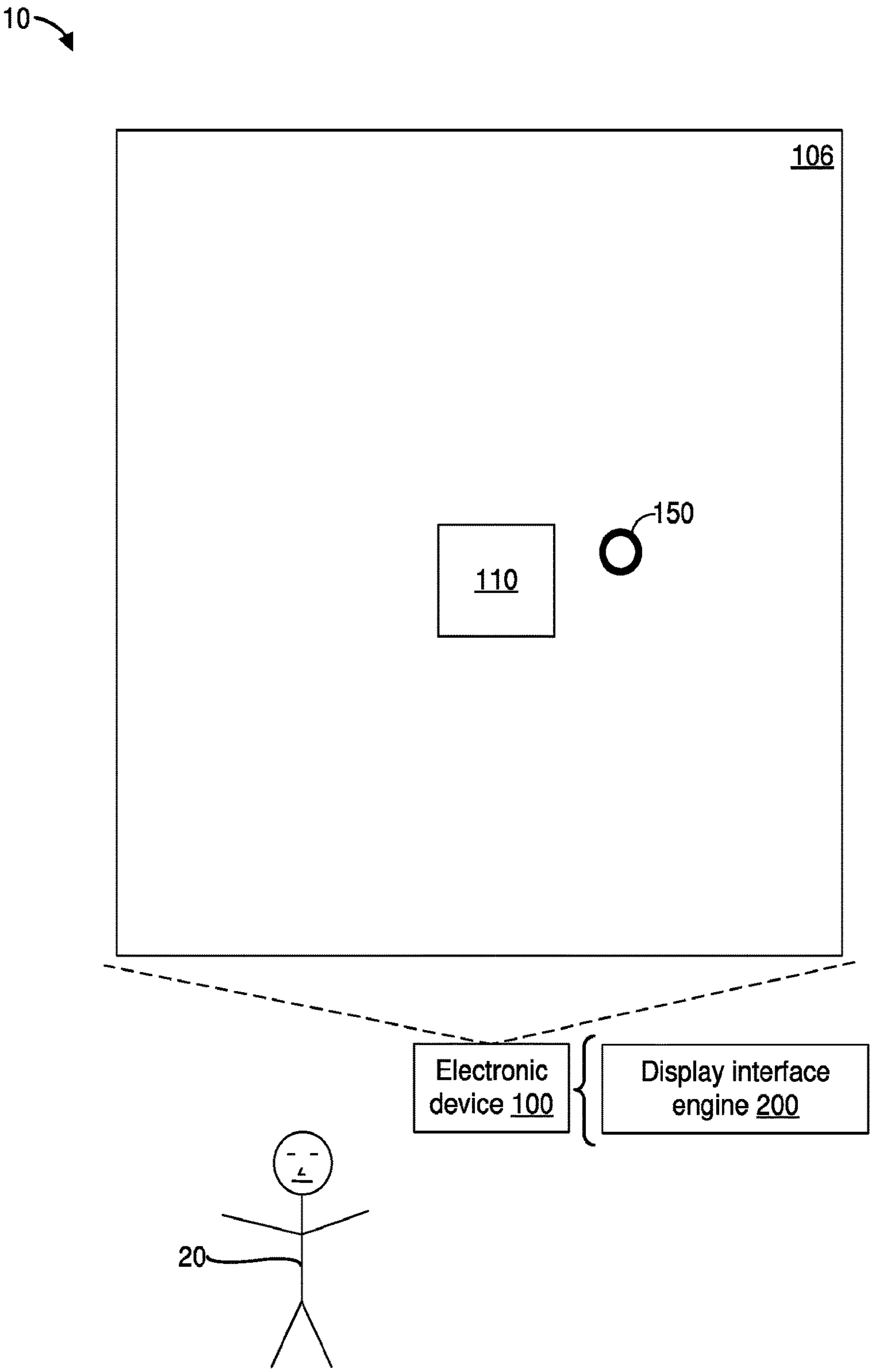

As represented in FIG. 1G, in some implementations, the electronic device 100 displays a collapsed indicator 150 in response to the user input 140. The collapsed indicator 150 may occupy less display area than the indicator 120. For example, the collapsed indicator 150 may be rendered in a smaller scale than the indicator 120. In some implementations, the collapsed indicator 150 displays a different time scale than the indicator 120 to accommodate a reduced size. For example, if the indicator 120 displays a representation of elapsed time in hours and minutes, the collapsed indicator 150 may display a representation of elapsed time in hours only.

Figure 1H:
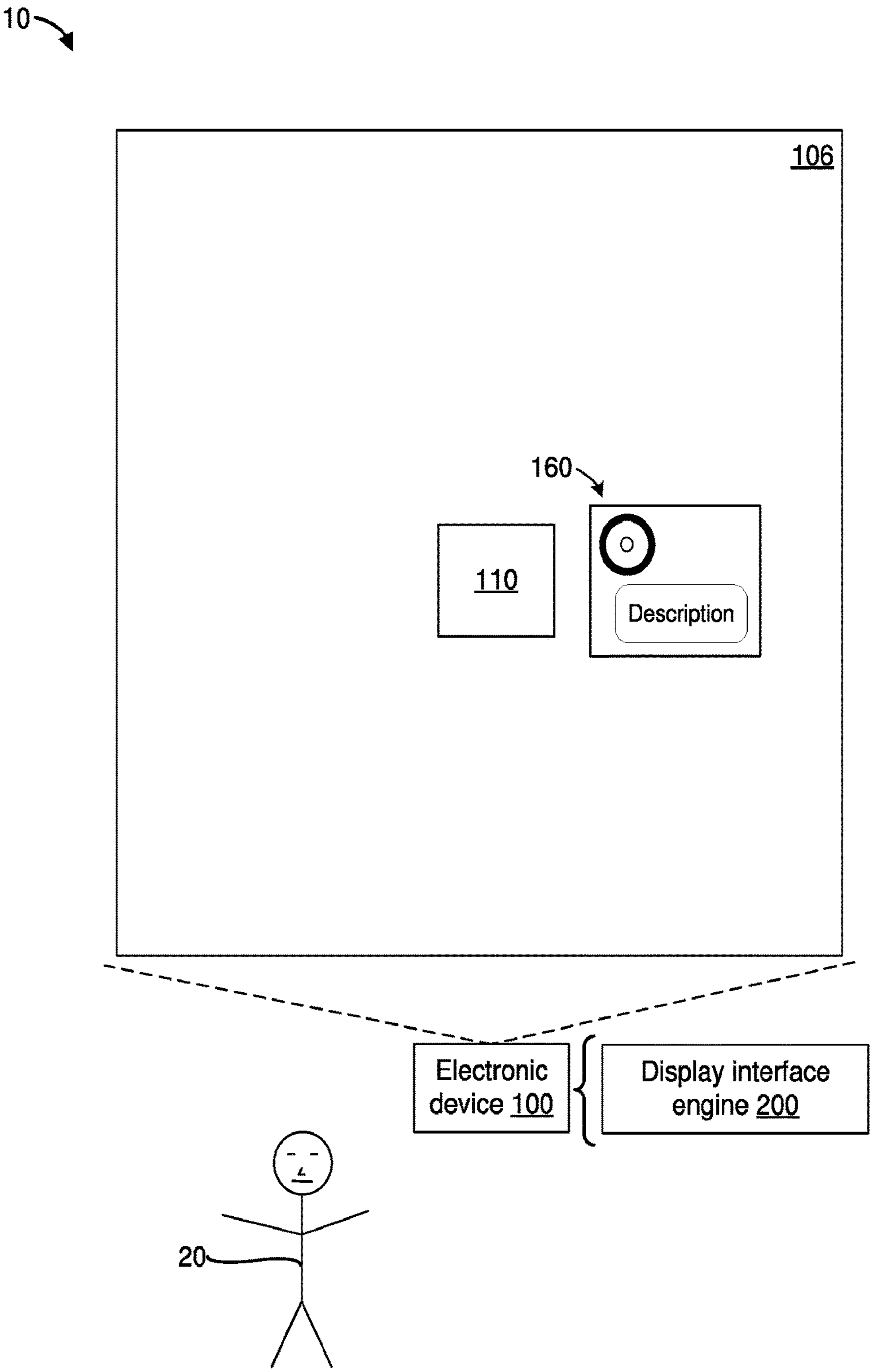

As represented in FIG. 1H, in some implementations, the electronic device 100 displays an expanded indicator 160 in response to the user input 140. The expanded indicator 160 may occupy more display area than the indicator 120. For example, the expanded indicator 160 may be rendered in a larger scale than the indicator 120. In some implementations, the expanded indicator 160 displays a different time scale than the indicator 120 to take advantage of the greater available display space. For example, if the indicator 120 displays a representation of elapsed time in hours, the expanded indicator 160 may display a representation of elapsed time in hours and minutes. In some implementations, the expanded indicator 160 displays additional information that is not displayed in the indicator 120. For example, the expanded indicator 160 may display a narrative description of the event that is being monitored.

Figure 1I:
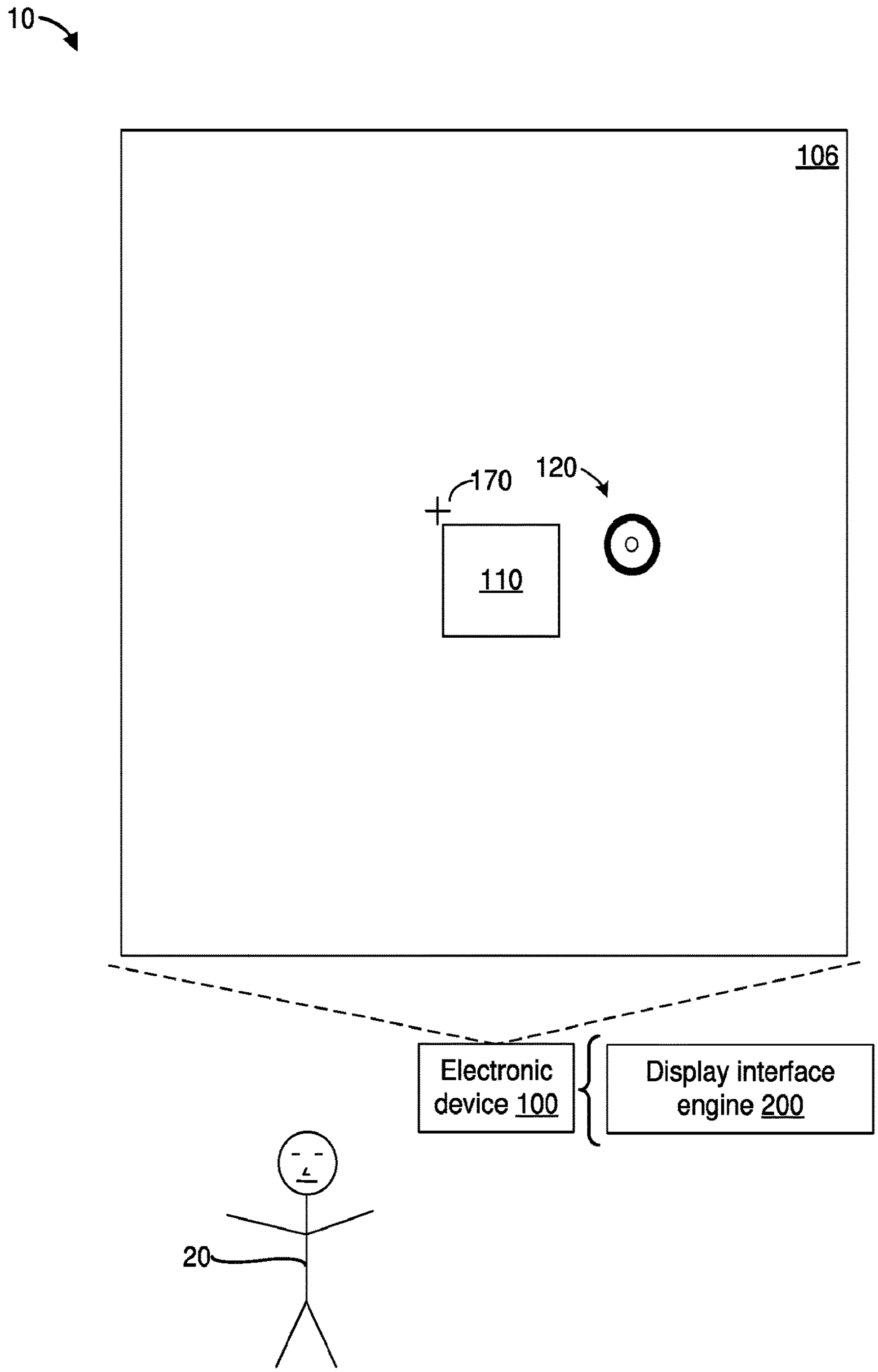

As represented in FIG. 1I, in some implementations, the electronic device 100 composites an affordance 170 with the representation 110 of the physical article. The affordance 170 may be implemented as a user-interactive graphical user interface object (e.g., a graphical user interface object that is configured to respond to inputs directed toward the graphical user interface object). Examples of user-interactive graphical user interface objects include, without limitation, buttons, sliders, icons, selectable menu items, switches, hyperlinks, and/or other user interface controls. In some implementations, the affordance 170 is visible. For example, the affordance 170 may be displayed proximate the representation 110 and may be opaque, translucent, or transparent. In some implementations, the affordance 170) is invisible.

Figure 1J:
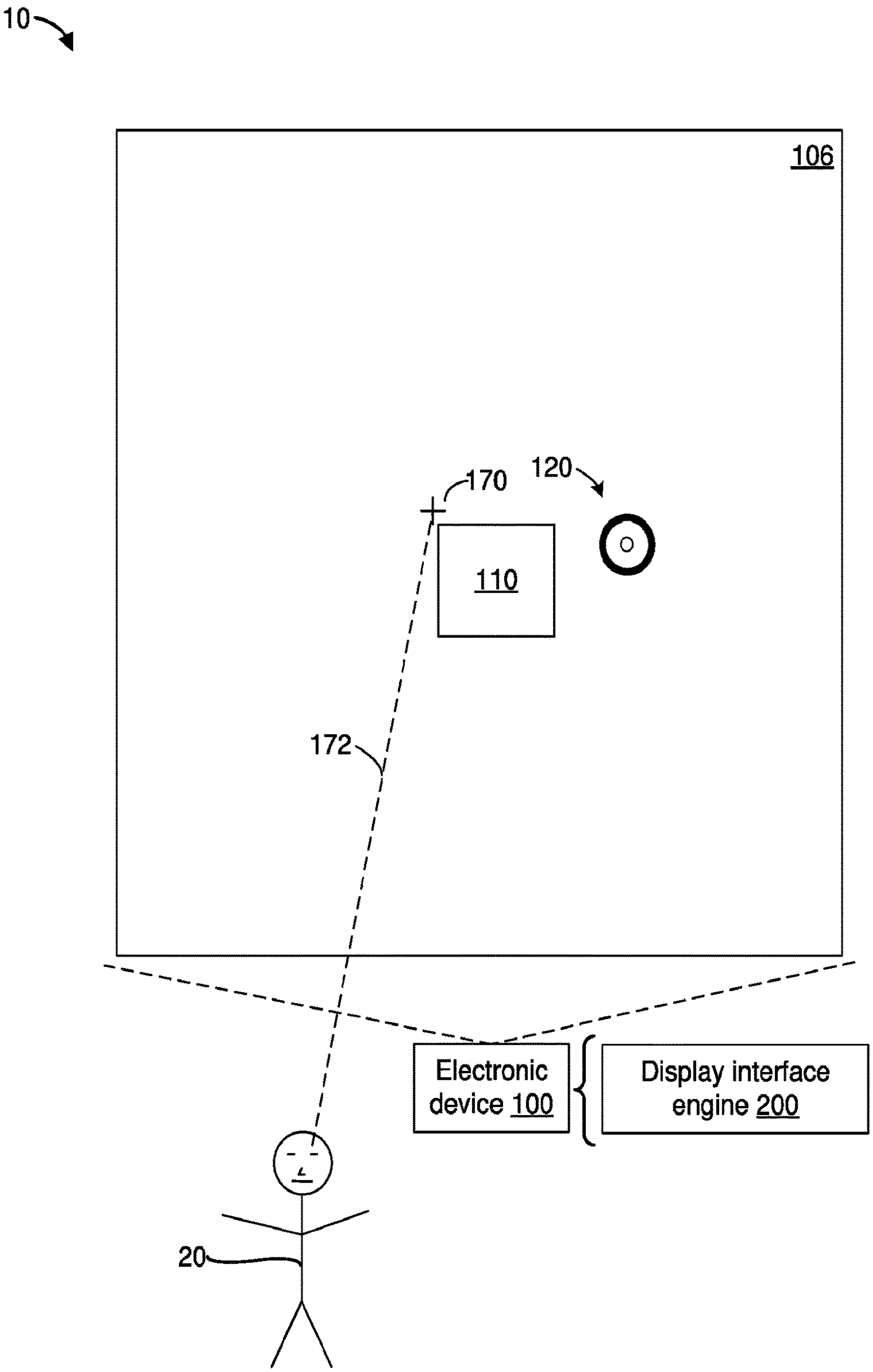

As represented in FIG. 1J, in some implementations, the electronic device 100 detects a user input 172 directed to the affordance 170. For example, the user input 172 may include a gesture input obtained by an image sensor. In some implementations, the user input 172 includes a gaze input. In some implementations, the user input 172 includes an audio input. For example, an audio sensor may obtain an audio signal corresponding to a spoken command (e.g., "reset the timer"). When the electronic device 100 detects the user input 172, the electronic device 100 may reset the monitored amount of time. In some implementations, as represented in FIG. 1J, the electronic device 100 adjusts the indicator 120 to display a representation of the monitored amount of time that has been reset.

Figure 1K:
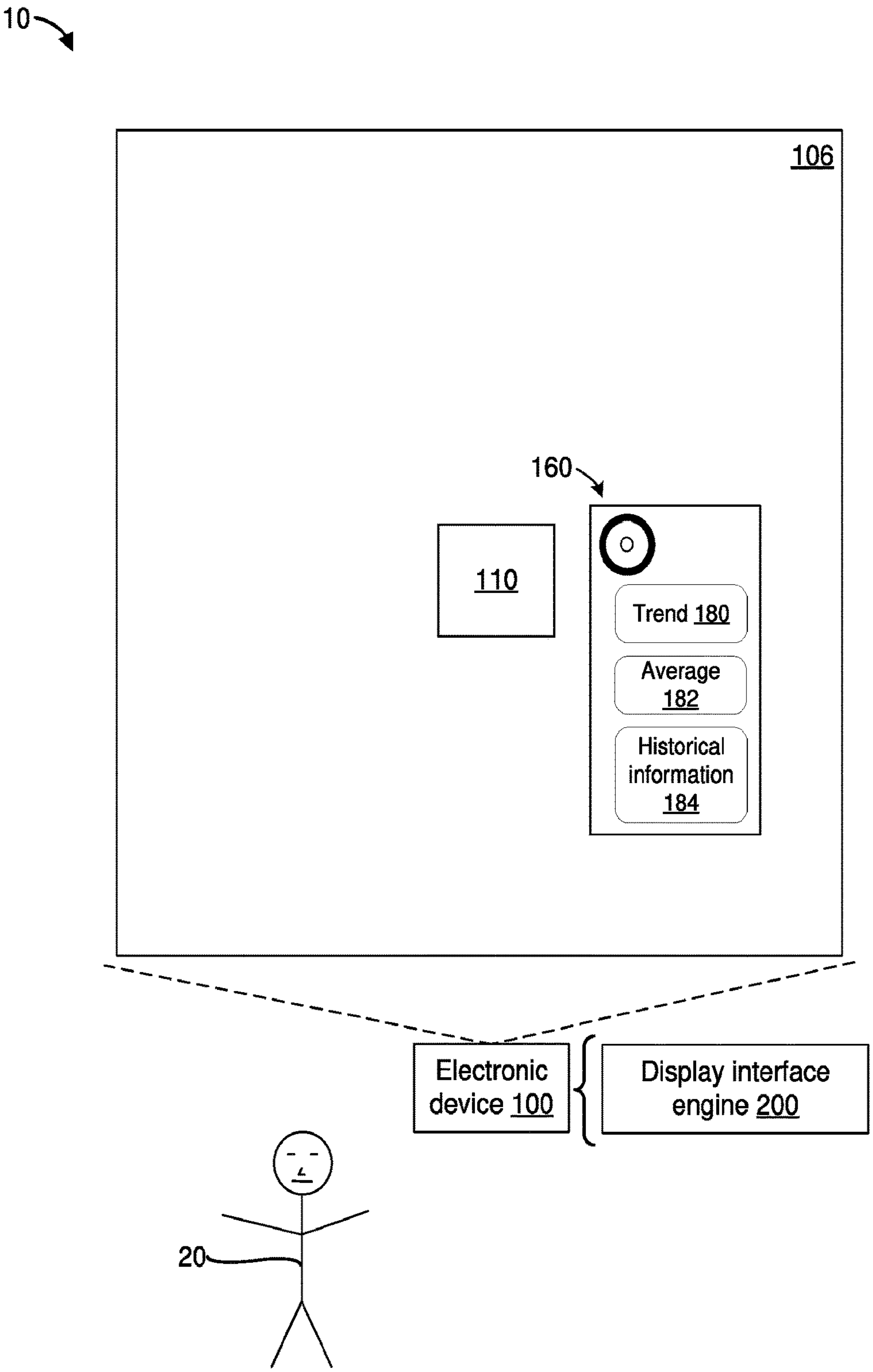

In some implementations, the electronic device 100 determines a plurality of respective time periods that correspond to a plurality of events associated with the physical article. For example, if the physical article is a plant, the electronic device 100 may monitor multiple time intervals over which the plant is watered. In some implementations, as represented in FIG. 1K, the indicator 120 displays a trend 180, an average 182, and/or historical information 184 relating to the plurality of time periods. For example, the indicator 120 may display the average time interval between watering events for a plant and/or a log of previous watering events.

In some implementations, the electronic device 100 includes or is attached to a head-mountable device (HMD) worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 2:
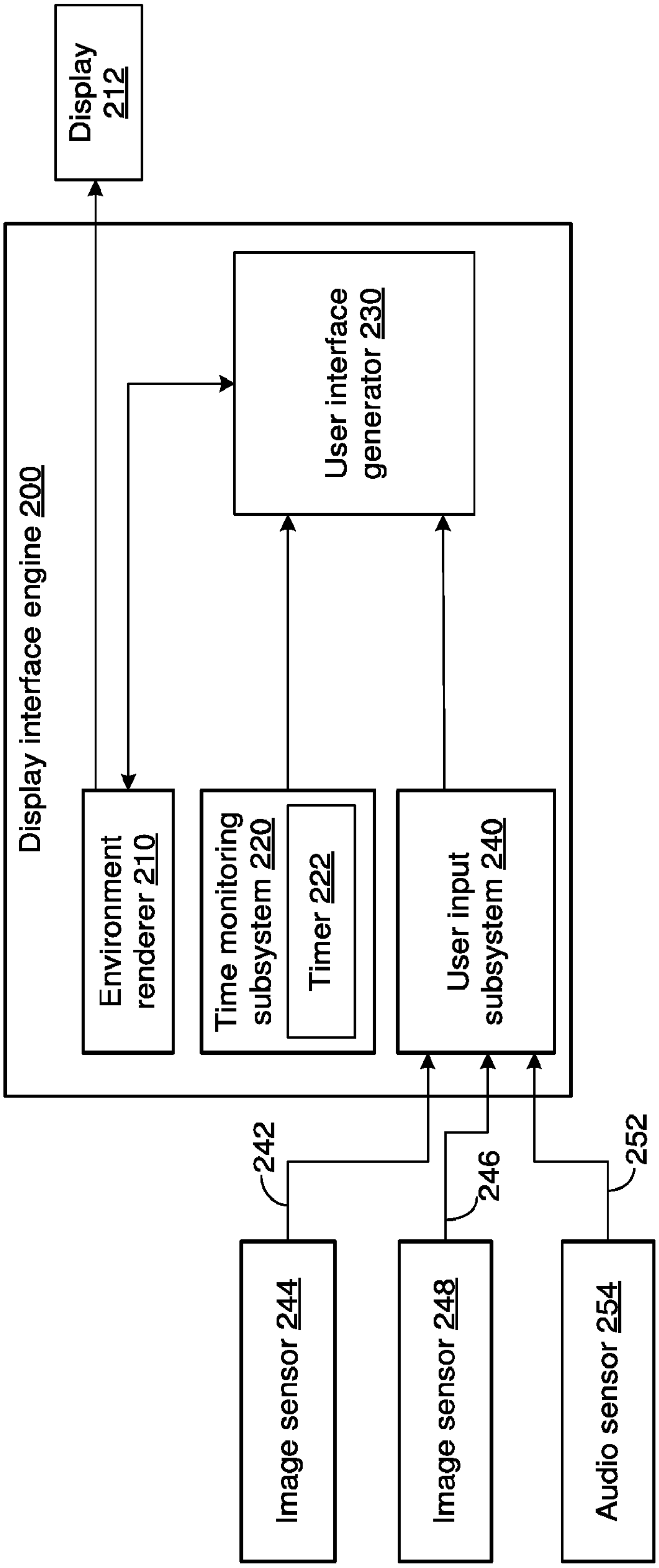
FIG. 2 is a block diagram of a display interface engine in accordance with some implementations.

FIG. 2 illustrates a block diagram of the display interface engine 200 in accordance with some implementations. In some implementations, the display interface engine 200 includes an environment renderer 210, a time monitoring subsystem 220, a user interface generator 230, and a user input subsystem 240. In various implementations, the environment renderer 210 causes an extended reality (XR) environment that includes a representation of a physical article to be displayed on a display 212. The XR environment may include a virtual environment that is a simulated replacement of a physical environment that is different from a physical environment in which the display interface engine 200 is located and that is synthesized by the environment renderer 210 or obtained from another device. In some implementations, the XR environment includes an augmented environment that is a modified version of a physical environment. For example, the environment renderer 210 may modify (e.g., augment) the physical environment in which the display interface engine 200 is located to generate the XR environment, e.g., by simulating a replica of the physical environment and/or by adding objects to or removing objects from the simulated replica of the physical environment. In some implementations, the environment renderer 210 adds objects to a passthrough portion of the XR environment.

With reference to FIG. 1A, the environment renderer 210 may display the XR environment 106, including the representation 110 of a physical article. The representation 110 may include a set of pixels representing a physical article, e.g., in the case of a video passthrough. In some implementations, e.g., an optical passthrough portion of an XR environment, the representation 110 includes the physical article as seen through a lens (e.g., a portion of the field of view corresponding to the physical article). In some implementations, the environment renderer 210 generates the XR environment. In some implementations, the environment renderer 210 receives the XR environment from another device that generated the XR environment.

In some implementations, the time monitoring subsystem 220 monitors an amount of time since a previous event associated with the physical article. For example, the time monitoring subsystem 220 may include a timer 222 that monitors the amount of time since the previous event. In some implementations, the time monitoring subsystem 220 compares a first timestamp (e.g., corresponding to a current time) with a second timestamp (e.g., corresponding to a time associated with the previous event) to determine the amount of time since the previous event. In some implementations, the time monitoring subsystem 220 receives an indication of the amount of time since the previous event.

In some implementations, the time monitoring subsystem 220 determines a plurality of respective time periods that correspond to a plurality of events associated with the physical article. For example, if the physical article is a plant, the time monitoring subsystem 220 may monitor multiple time intervals over which the plant is watered. In some implementations, the time monitoring subsystem 220 determines one or more of a trend, an average, and/or historical information relating to the plurality of time periods. For example, the time monitoring subsystem 220 may determine the average time interval between watering events for a plant and/or a log of previous watering events.

In some implementations, the user interface generator 230 synthesizes a user interface that displays an indicator of the amount of time proximate the representation of the physical article. For example, the user interface generator 230 may generate a user interface and insert the user interface into the XR environment 106 to be rendered by the environment renderer 210. In some implementations, the user interface generator 230 modifies the XR environment 106 to generate a modified XR environment that includes a representation of the user interface.

The user interface includes an indicator of the amount of time since the previous event associated with the physical article. The indicator may be displayed proximate the representation of the physical article and may have an appearance that represents the amount of time. In some implementations, as represented in Figures IA-1K, the indicator includes one or more rings that represent the amount of time. For example, a ring may be displayed with a thickness that corresponds to the amount of time. In some implementations, a ring includes an arc section having an arc length that corresponds to the amount of time. In some implementations, the indicator includes multiple rings, and the number and/or spacing of the rings corresponds to the amount of time.

In some implementations, the user interface generator 230 changes a visual property of the indicator based on a time scale of the indicator. For example, a dimension (e.g., a thickness) of the indicator may be used to represent the time scale of the indicator, with thin rings representing a first time scale (e.g., minutes) and thick rings representing a second time scale (e.g., hours) larger than the first time scale. In some implementations, the user interface generator 230 changes a color and/or a brightness of the indicator based on the time scale of the indicator. For example, a first color or brightness level may be used to represent a first time scale. If the time scale of the indicator changes, e.g., due to the passage of time, the user interface generator 230 may change the indicator to a second color or brightness level different from the first color or brightness level to indicate a different time scale. In some implementations, multiple rings of a single color or brightness level represent multiple units of a corresponding time scale. In some implementations, a single ring includes an arc section having an arc length that represents the units of a corresponding time scale. In some implementations, the user interface generator 230 changes a color and/or a brightness of the indicator to indicate that an acceptable (e.g., desired) or unacceptable (e.g., undesired) amount of time has elapsed relative to a threshold or thresholds. For example, if the indicator is used to indicate an amount of time since a plant has been watered, the indicator may be green if the time since the last watering event is less than a first threshold. If the time since the last watering event is greater than the first threshold, the indicator may progressively change from green to red. If the time since the last watering event is greater than a second threshold, the indicator may be red.

In some implementations, the indicator includes a plurality of rings that are separated by a distance d. In some implementations, the distance d changes based on the amount of time. For example, the distance d may decrease as the amount of time increases (e.g., the rings may become closer together). In some implementations, when the amount of time breaches a threshold (e.g., an hour), the time scale of the indicator changes, and a visual property of the indicator may change as disclosed herein. For example, when the time scale of the indicator changes from minutes to hours, the rings may be displayed with a thicker appearance to indicate the change in time scale.

In some implementations, the user input subsystem 240 detects a user input directed to the indicator. For example, the user input subsystem 240 may obtain a gesture input 242 from an image sensor 244 (e.g., a scene-facing image sensor). In some implementations, the user input subsystem 240 obtains a gaze input 246 from a user-facing image sensor 248 (e.g., a front-facing camera or an inward-facing camera). The user-facing image sensor 248 may capture a set of one or more images of the eyes of the user and may generate image data. The image data may be used to determine a gaze vector. The user input subsystem 240 may determine, based on the gaze vector, that the gaze of the user is directed to a location (e.g., the indicator) within the field of view. In some implementations, the user input subsystem 240 obtains an audio input 252. For example, an audio sensor 254 may obtain an audio signal corresponding to a spoken command (e.g., "reset the timer").

In some implementations, the user interface generator 230 displays a collapsed indicator in response to the user input. The collapsed indicator may display a different time scale (e.g., a less granular time scale) than the indicator to accommodate a reduced size. In some implementations, the collapsed indicator displays less information than the indicator. For example, if the indicator includes a description of the event that is being monitored, the collapsed indicator may omit the description. In some implementations, the user interface generator displays an expanded indicator in response to the user input. The expanded indicator displays a different time scale (e.g., a more granular time scale) than the indicator to take advantage of the greater available display space. In some implementations, the expanded indicator displays additional information that is not displayed in the indicator. For example, the expanded indicator may display a narrative description of the event that is being monitored.

In some implementations, the user interface generator 230 displays an affordance in connection with the representation of the physical article. The affordance may be implemented as a user-interactive graphical user interface object. Examples of user-interactive graphical user interface objects include, without limitation, buttons, sliders, icons, selectable menu items, switches, hyperlinks, and/or other user interface controls.

In some implementations, the user input subsystem 240 obtains a user input directed to the affordance. For example, the user input may include the gesture input 242 obtained by the image sensor 244. In some implementations, the user input includes the gaze input 246. In some implementations, the user input includes the audio input 252. For example, the audio sensor 254 may obtain an audio signal corresponding to a spoken command (e.g., "reset the timer"). When the user input subsystem 240 obtains the user input, the time monitoring subsystem 220 may reset the monitored amount of time. In some implementations, the user interface generator 230 adjusts the indicator to display a representation of the monitored amount of time that has been reset.

Figure 3A:
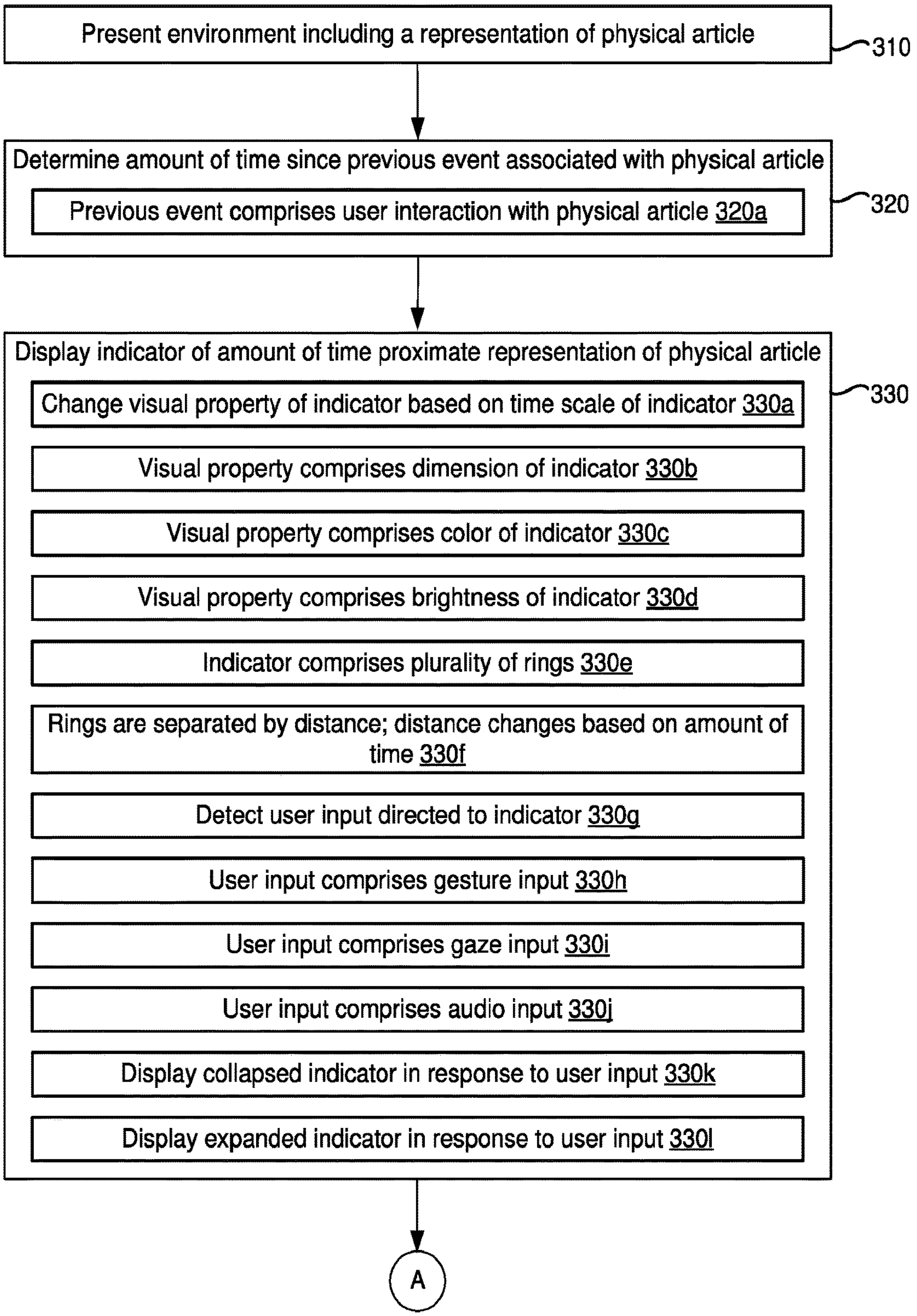
FIGS. 3A-3B are a flowchart representation of a method of associating chronology with a physical article.
Figure 3B:
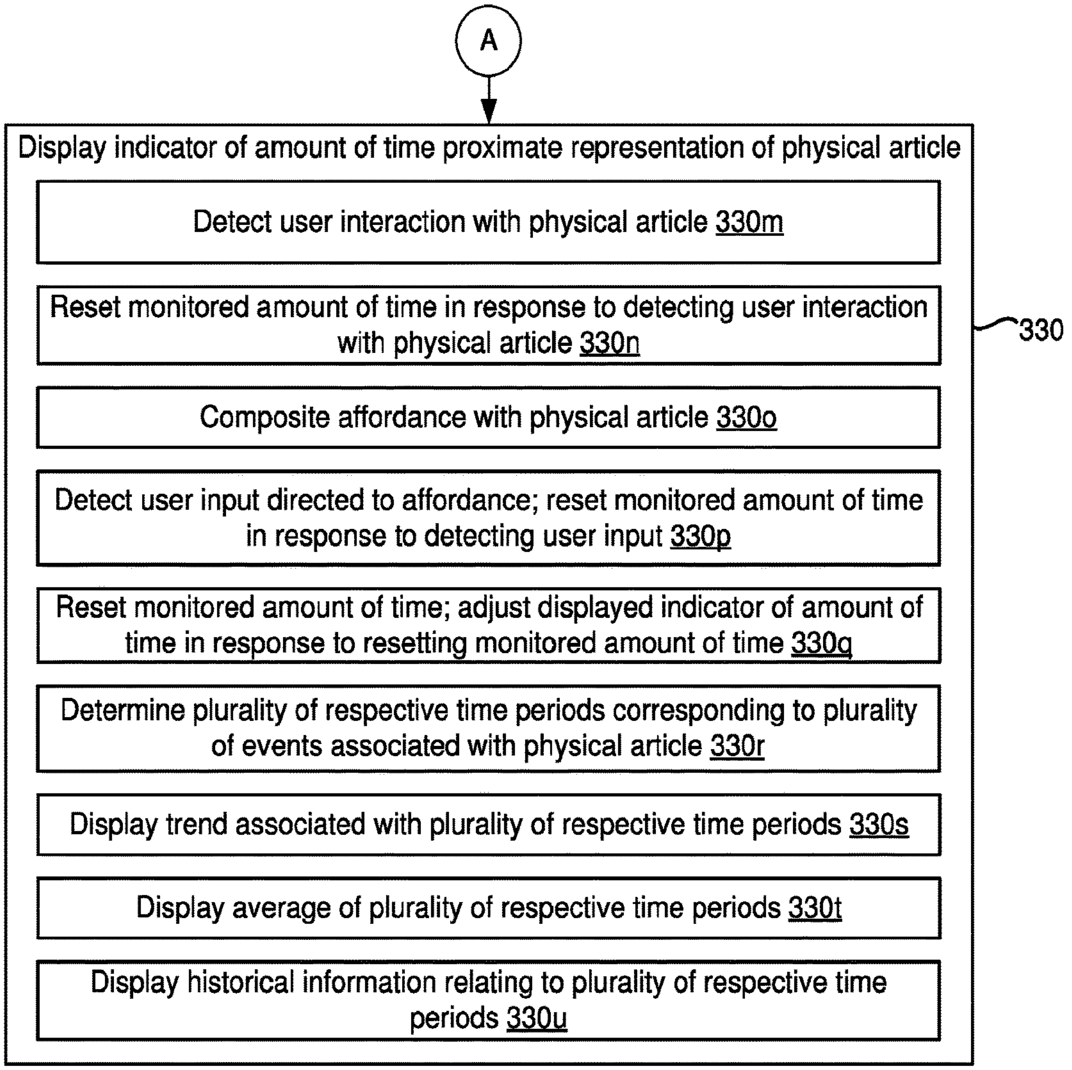

FIGS. 3A-3B are a flowchart representation of a method 300 for associating chronology with a physical article. In various implementations, the method 300 is performed by a device (e.g., the electronic device 100 shown in FIGS. 1A-1K, or the display interface engine 200 shown in FIGS. 1A-1K and 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes presenting an XR environment that includes a representation of a physical article. In some implementations, the XR environment is generated. In some implementations, the XR environment is received from another device that generated the XR environment.

The XR environment may include a virtual environment that is a simulated replacement of a physical environment. In some implementations, the XR environment is synthesized by the electronic device 100 and is different from a physical environment in which the electronic device 100 is located. In some implementations, the XR environment includes an augmented environment that is a modified version of a physical environment. For example, the physical environment may be modified (e.g., augmented) to generate the XR environment, e.g., by simulating a replica of the physical environment and/or by adding objects to or removing objects from the simulated replica of the physical environment. In some implementations, objects are added to a passthrough portion of the XR environment.

In some implementations, the XR environment includes a representation of a physical article. The representation may include a set of pixels representing the physical article, e.g., in the case of a video passthrough. In some implementations, the representation includes the physical article, e.g., as seen through a lens, as in the case of an optical passthrough.

In various implementations, as represented by block 320, the method 300 includes determining an amount of time that has passed since an occurrence of a previous event associated with the physical article. For example, a timer may monitor the amount of time since the previous event. In some implementations, the electronic device 100 compares a first timestamp (e.g., corresponding to a current time) with a second timestamp (e.g., corresponding to a time associated with the previous event) to determine the amount of time since the previous event. In some implementations, the electronic device 100 receives an indication of the amount of time since the previous event. In some implementations, as represented by block 320*a*, the previous event comprises a user interaction with the physical article. For example, if the physical article is an oven, the amount of time since the oven has been preheated may be monitored.

In various implementations, as represented by block 330, the method 300 includes displaying an indicator of the amount of time proximate to the representation of the physical article. The indicator may have an appearance that represents the amount of time. For example, the indicator may include one or more rings. In some implementations, the thickness of the one or more rings corresponds to the amount of time. In some implementations, a ring may include an arc section that has a length that corresponds to the amount of time. As the amount of time increases, the size of the arc section may also increase.

In some implementations, as represented by block 330*a*, the method 300 includes changing a visual property of the indicator based on a time scale of the indicator. As represented by block 330*b*, the visual property may include a dimension of the indicator. For example, the electronic device 100 may change a thickness of the indicator to indicate that the indicator represents a larger or smaller unit of time.

As represented by block 330*c*, in some implementations, the visual property includes a color of the indicator. For example, a first color may correspond to a time scale of hours. A second color different from the first color may correspond to a time scale of days. Multiple rings of the first and second colors may be used to represent multiple hours and/or days, respectively.

In some implementations, as represented by block 330*d*, the visual property includes a brightness of the indicator. For example, a first brightness level may correspond to a time scale of days. A second brightness level different from the first brightness level may correspond to a time scale of weeks. Multiple rings of the first and second brightness levels may be used to represent multiple days and/or weeks, respectively. In some implementations, a first ring of the first brightness level has an arc section having a first arc length corresponding to a number of days, and a second ring of the second brightness level has an arc section having a second arc length corresponding to a number of weeks.

In some implementations, as represented by block 330*e*, the indicator includes a plurality of rings. As represented by block 330*f*, the rings may be separated by a distance, and the distance may change based on the amount of time. For example, the distance may decrease as the amount of time increases (e.g., the rings may become closer together). In some implementations, when the amount of time breaches a threshold (e.g., an hour), the time scale of the indicator changes, and a visual property of the indicator may change as disclosed herein. For example, when the time scale of the indicator changes from minutes to hours, the rings may be displayed with a thicker appearance to indicate the change in time scale.

As represented by block 330*g*, in some implementations, the method 300 includes detecting a user input directed to the indicator. For example, as represented by block 330*h*, the user input may include a gesture input. The gesture input may be obtained from an image sensor (e.g., a scene-facing image sensor). In some implementations, as represented by block 330*i*, the user input includes a gaze input, e.g., obtained from a user-facing image sensor (e.g., a front-facing camera or an inward-facing camera). The user-facing image sensor may capture a set of one or more images of the eyes of the user and may generate image data that may be used to determine a gaze vector. In some implementations, as represented by block 330*j*, the user input includes an audio input. For example, an audio sensor may obtain an audio signal corresponding to a spoken command (e.g., "reset the timer").

In some implementations, as represented by block 330*k*, the method 300 includes displaying a collapsed indicator in response to the user input. The collapsed indicator may display a different time scale (e.g., a less granular time scale) than the indicator to accommodate a reduced size. In some implementations, the collapsed indicator displays less information than the indicator. For example, if the indicator includes a description of the event that is being monitored, the collapsed indicator may omit the description. In some implementations, as represented by block 330*l*, the method 300 includes displaying an expanded indicator in response to the user input. The expanded indicator displays a different time scale (e.g., a more granular time scale) than the indicator to take advantage of the greater available display space. In some implementations, the expanded indicator displays additional information that is not displayed in the indicator. For example, the expanded indicator may display a narrative description of the event that is being monitored.

In some implementations, as represented by block 330*m* of FIG. 3B, the method 300 includes detecting a user interaction with the physical article. For example, if the physical article is a plant, the electronic device 100 may detect (e.g., via an image sensor) that the user has watered the plant. In some implementations, a type of the user interaction is determined (e.g., identified) based on a type of the physical article. For example, if the physical article is a plant, a user interaction may automatically be identified as a watering event. If the physical article is an oven, a user interaction may automatically be identified as an activation event or a food insertion event. In some implementations, detection of the user interaction with the physical article is defined or specified by the user. For example, the user may specify that a timer should be set each time the user empties a trash can. In some implementations, the user interaction with the physical article is a touch or a particular action performed with respect to the physical article. As represented by block 330*n*, in some implementations, the method 300 includes resetting the monitored amount of time in response to detecting the user interaction with the physical article.

In some implementations, as represented by block 3300, the method 300 includes compositing an affordance with the representation of the physical article. The affordance may be implemented as a user-interactive graphical user interface object. Examples of user-interactive graphical user interface objects include, without limitation, buttons, sliders, icons, selectable menu items, switches, hyperlinks, and/or other user interface controls. In some implementations, as represented by block 330*p*, the method 300 includes detecting a user input directed to the affordance and resetting the monitored amount of time in response to detecting the user input. For example, the user input may include a gesture input, a gaze input, and/or an audio input. As represented by block 330*q*, the method 300 may include resetting the monitored amount of time and adjusting the displayed indicator of the amount of time in response to resetting the monitored amount of time.

In some implementations, as represented by block 330*r*, the method 300 includes determining a plurality of respective time periods corresponding to a plurality of events associated with the physical article. For example, if the physical article is a plant, multiple watering intervals may be determined. In some implementations, a plurality of respective time periods are determined corresponding to different types of interactions with the physical article. For example, if the physical article is an oven, a first time period may be associated with a first interaction with the oven (e.g., placing a pie into the oven). A second time period may be associated with a second interaction with the oven (e.g., placing a sheet of cookies into the oven).

In some implementations, as represented by block 330*s*, the method 300 includes displaying a trend associated with the plurality of respective time periods. For example, the indicator may notify the user of whether a watering interval is increasing or decreasing relative to previous watering intervals. In some implementations, as represented by block 330*t*, the method 300 includes displaying an average of the plurality of respective time periods. As represented by block 330*u*, historical information relating to the plurality of respective time periods may be displayed.

Figure 4:
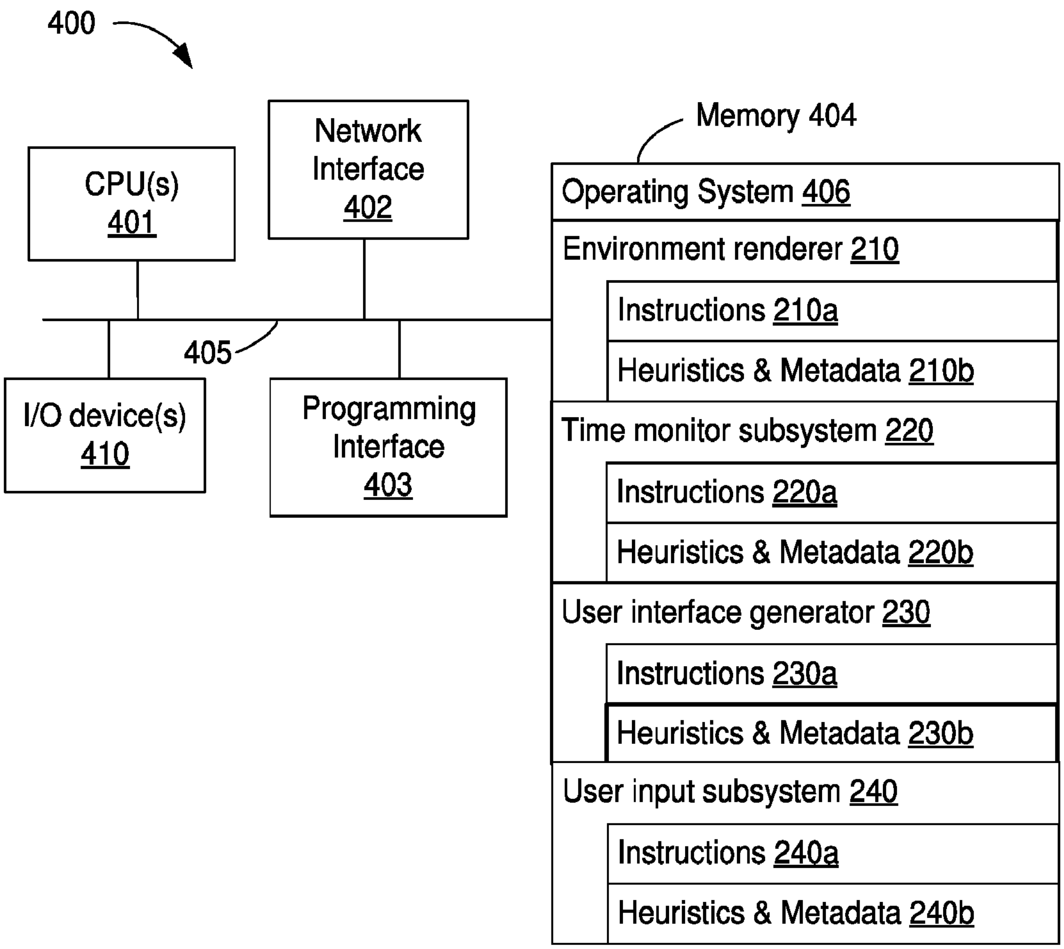
FIG. 4 is a block diagram of a device that associates chronology with a physical article in accordance with some implementations.

FIG. 4 is a block diagram of a device 400 in accordance with some implementations. In some implementations, the device 400 implements the electronic device 100 shown in FIGS. 1A-1K, and/or the display interface engine 200 shown in FIGS. 1A-1K and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the environment renderer 210, the time monitoring subsystem 220, the user interface generator 230, and the user input subsystem 240. In various implementations, the device 400 performs the method 300 shown in FIGS. 3A-3B.

In some implementations, the environment renderer 210 displays an extended reality (XR) environment that includes a representation of a physical article. In some implementations, the environment renderer 210 performs at least some of the operation(s) represented by block 310 in FIGS. 3A-3B. To that end, the environment renderer 210 includes instructions 210*a* and heuristics and metadata 210*b*.

In some implementations, the time monitoring subsystem 220 monitors an amount of time since a previous event associated with the physical article. In some implementations, the time monitoring subsystem 220 performs the operation(s) represented by block 320 in FIGS. 3A-3B. To that end, the time monitoring subsystem 220 includes instructions 220*a* and heuristics and metadata 220*b*.

In some implementations, the user interface generator 230) synthesizes a user interface that displays an indicator of the amount of time proximate the representation of the physical article. In some implementations, the user interface generator 230) performs the operations represented by block 330 in FIGS. 3A-3B. To that end, the user interface generator 230 includes instructions 230*a* and heuristics and metadata 230*b*.

In some implementations, the user input subsystem 240 detects a user input directed to the indicator. To that end, the user input subsystem 240 includes instructions 240*a* and heuristics and metadata 240*b*.

In some implementations, the one or more I/O devices 410 include a user-facing image sensor. In some implementations, the one or more I/O devices 410 include one or more head position sensors that sense the position and/or motion of the head of the user. In some implementations, the one or more I/O devices 410 include a display for presenting the graphical environment (e.g., for presenting the XR environment 106). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device comprising a display, one or more processors, and a non-transitory memory:

presenting, via the display, an extended reality (XR) environment that includes a representation of a physical article;

monitoring, by the device, events associated with the physical article, including detecting, by the device, an occurrence of a previous event associated with the physical article;

in response to detecting the occurrence of the previous event, setting, by the device, a timer that tracks an amount of time that has passed since the occurrence of the previous event; and displaying, on the display, the timer with an indicator of the amount of time proximate to the representation of the physical article, wherein the indicator has a first appearance corresponding to a first time scale and a second appearance corresponding to a second time scale, wherein the second appearance is different from the first appearance.

2. The method of claim 1, wherein the previous event comprises a user interaction with the physical article.

3. The method of claim 1, further comprising determining a type of the previous event based on a type of the physical article.

4. The method of claim 1, wherein the indicator represents elapsed time according to the first time scale for a first range of elapsed time, further comprising changing a visual property of the indicator from the first appearance to the second appearance in response to the elapsed time exceeding the first range of elapsed time.

5. The method of claim 4, wherein the visual property comprises a combination of a dimension of the indicator, a color of the indicator and a brightness of the indicator.

6. The method of claim 1, wherein the indicator comprises a plurality of rings separated by a distance that changes based on the amount of time.

7. The method of claim 1, further comprising detecting a user input directed to the indicator, wherein the user input comprises a gesture input, a gaze input or an audio input.

8. The method of claim 7, further comprising, in response to the user input, displaying a collapsed indicator or an expanded indicator.

9. The method of claim 1, further comprising:

detecting a user interaction with the physical article; and resetting the amount of time in response to detecting the user interaction with the physical article.

10. The method of claim 1, further comprising:

compositing an affordance with the representation of the physical article;

detecting a user input directed to the affordance; and resetting the amount of time in response to detecting the user input.

11. The method of claim 1, further comprising:

resetting the amount of time; and adjusting the displayed indicator of the amount of time in response to resetting the amount of time.

12. The method of claim 1, further comprising determining a plurality of respective time periods corresponding to a plurality of events associated with the physical article.

13. The method of claim 12, further comprising displaying a combination of a trend, an average and historical information associated with the plurality of respective time periods.

14. The method of claim 1, wherein the device comprises a head-mountable device (HMD).

15. The method of claim 1, wherein presenting the XR environment comprises presenting a pass-through representation of a physical environment of the device on the display, and wherein displaying the indicator comprises overlaying the indicator on the pass-through representation of the physical environment.

16. The method of claim 1, wherein the indicator has the first appearance including a ring for a first range of elapsed time, further comprising, in response to the elapsed time exceeding the first range of elapsed time, changing the indicator to the second appearance with an additional ring such that the indicator comprises a plurality of rings.

17. The method of claim 1, wherein the first appearance corresponding to the first time scale includes a first ring having a first thickness and the second appearance corresponding to the second time scale includes a second ring having a second thickness.

18. The method of claim 1, wherein the first appearance corresponding to the first time scale includes a first ring having a first arc section with a first length corresponding to a first amount of time and the second appearance corresponding to the second time scale includes a second ring having a second arc section with a second length corresponding to a second amount of time.

19. A device comprising:

one or more processors;

a non-transitory memory;

a display;

an audio sensor;

an input device; and one or more programs stored in the non-transitory memory, which, when executed by the one or more processors, cause the device to:

present, via the display, an extended reality (XR) environment that includes a representation of a physical article;

monitor, by the device, events associated with the physical article, including detecting, by the device, an occurrence of a previous event associated with the physical article;

in response to detecting the occurrence of the previous event, set, by the device, a timer that tracks an amount of time that has passed since the occurrence of the previous event; and display, on the display, the timer with an indicator of the amount of time proximate to the representation of the physical article, wherein the indicator has a first appearance corresponding to a first time scale and a second appearance corresponding to a second time scale, wherein the second appearance is different from the first appearance.

20. A non-transitory memory storing one or more programs, which, when executed by one or more processors of a device, cause the device to:

present, via a display, an extended reality (XR) environment that includes a representation of a physical article;

monitor, by the device, events associated with the physical article, including detecting, by the device, an occurrence of a previous event associated with the physical article;

in response to detecting the occurrence of the previous event, set, by the device, a timer that tracks an amount of time that has passed since the occurrence of the previous event; and display, on the display, the timer with an indicator of the amount of time proximate to the representation of the physical article, wherein the indicator has a first appearance corresponding to a first time scale and a second appearance corresponding to a second time scale, wherein the second appearance is different from the first appearance.

* * * * *